(12) United States Patent
Sato

(10) Patent No.: US 7,787,433 B2
(45) Date of Patent: Aug. 31, 2010

(54) WIRELESS COMMUNICATION METHOD, WIRELESS COMMUNICATION SYSTEM USING THE SAME, AND WIRELESS TERMINAL THEREOF

(75) Inventor: Manabu Sato, Sagamihara (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 230 days.

(21) Appl. No.: 10/586,146

(22) PCT Filed: Jan. 13, 2005

(86) PCT No.: PCT/JP2005/000634

§ 371 (c)(1),
(2), (4) Date: Jul. 14, 2006

(87) PCT Pub. No.: WO2005/069656

PCT Pub. Date: Jul. 28, 2005

(65) Prior Publication Data

US 2007/0086407 A1    Apr. 19, 2007

(30) Foreign Application Priority Data

Jan. 16, 2004    (JP)    ............................. 2004-008881

(51) Int. Cl.
*H04B 7/208*    (2006.01)
*H04M 1/00*    (2006.01)
(52) U.S. Cl. .................................... 370/344; 455/552.1
(58) Field of Classification Search .............. 455/552.1, 455/13.1; 370/330
See application file for complete search history.

(56) References Cited

U.S. PATENT DOCUMENTS 5,790,527 A * 8/1998 Janky et al. ................. 370/330

(Continued)

FOREIGN PATENT DOCUMENTS

CA    2183940    2/1997

(Continued)

OTHER PUBLICATIONS

International Preliminary Examination Report (Application No. PCT/JP2005/000634) dated Oct. 26, 2006.

(Continued)

*Primary Examiner*—Vincent P Harper
*Assistant Examiner*—Omoniyi A Obayanju
(74) *Attorney, Agent, or Firm*—Eric J. Robinson; Robinson Intellectual Property Law Office, P.C.

(57) ABSTRACT

A business wireless communication system, which includes both a repeater relay station of a wireless network using a repeater system and an FDMA relay station of a wireless network using FDMA system, comprises means for ensuring that the repeater relay station, when receiving a call signal from a repeater wireless terminal of the wireless communication network of the repeater system, is communication-line-connected to the FDMA relay station so as to forward the call signal to the FDMA relay station, which sets the forwarded call signal to a control signal and transmits it to an FDMA wireless terminal of the wireless communication network of the FDMA system; and means for ensuring that the FDMA wireless terminal receives the control signal to communicate with the repeater wireless terminal via the repeater relay station. In this way, there can be provided a wireless communication method, a system using the same, and a wireless terminal thereof, wherein a single reception frequency is used to attend to call signals of two different wireless communication systems.

4 Claims, 4 Drawing Sheets

U.S. PATENT DOCUMENTS 5,818,833 A 10/1998 Maruyama
2001/0031624 A1* 10/2001 Schmutz .................... 455/13.4

FOREIGN PATENT DOCUMENTS

| JP | 04-287436 | 10/1992 |
|----|-----------|---------|
| JP | 08-265248 | 10/1996 |
| JP | 09-065429 | 3/1997 |
| JP | 09-233547 | 9/1997 |
| JP | 10-200949 | 7/1998 |

OTHER PUBLICATIONS

International Search Report for PCT/JP2005/000634 dated Apr. 12, 2005.
International Search Report for PCT/JP2005/000634 dated Feb. 14, 2006.
Office Action (Application No. 2004-008881) dated Nov. 18, 2008.

* cited by examiner

FIG. 3A

| CALL CLASSIFIER | TERMINAL IDENTIFIER |

FIG. 3B

| SYNCHRONOUS SIGNAL PATTERN | CALL CLASSIFIER | TERMINAL IDENTIFIER | RELAY STATION IDENTIFIER | INFORMATION ADDED BY RELAY STATION |

FIG. 3C

| SYNCHRONOUS SIGNAL PATTERN | SYSTEM INFORMATION | TERMINAL CONTROL INFORMATION | SYNCHRONOUS SIGNAL PATTERN | SYSTEM INFORMATION | TERMINAL CONTROL INFORMATION |

WIRELESS COMMUNICATION METHOD, WIRELESS COMMUNICATION SYSTEM USING THE SAME, AND WIRELESS TERMINAL THEREOF

TECHNICAL FIELD

The present invention relates to a wireless communication method for waiting for call signals from relay stations using different wireless communication systems, a wireless communication system using the same and a wireless terminal thereof.

BACKGROUND ART

In a business wireless communication system, when replacing the existing system with a new system, it is often difficult to replacing everything including wireless terminals and a wireless relay system, from a viewpoint of cost or a viewpoint of keeping the stability of the system. Therefore, a method is adopted in which a lot of time is spent for transition to the new system. During the transition period, however, wireless terminals operating on the two different systems are required to alternatively receive signals of both of the systems to wait for a call thereto. In this case, there is a problem that, if there is any system that has to always wait for a signal from a relay station, and there is a call from the system while a wireless terminal is waiting for a signal from the other system, the wireless terminal cannot receive the call. As a method for extending a function by utilizing a control channel signal, a method for changing a control channel to a voice channel, for example, is proposed in Japanese Patent No. 2724917.

The present invention has been made to effectively solve the above problem in the conventional technique, and its object is to provide a wireless communication method for waiting for call signals of two different wireless communication systems with a single reception frequency, a wireless communication system using the same and a wireless terminal thereof.

DISCLOSURE OF THE INVENTION

In order to achieve the above object of the invention, a wireless communication method according to a first aspect of the present invention is used in a wireless communication system which includes both a repeater relay station of a wireless communication network using repeater system and a frequency division multiple access (FDMA) relay station of a wireless communication network using FDMA system, and the method basically includes the following sequence of signal processing steps:

receiving a call signal from a repeater wireless terminal in the wireless communication network using repeater system, by the repeater relay station;
forwarding the call signal received by the repeater relay station to the FDMA relay station;
setting the forwarded call signal for a control signal at the FDMA relay station;
transmitting the control signal to an FDMA wireless terminal in the wireless communication network using FDMA system; and
the FDMA wireless terminal, which has received the control signal, communicating with the repeater wireless terminal via the repeater relay station.

A wireless communication system according to a second aspect of the present invention is such that includes both a repeater relay station of a wireless communication network using repeater system and an FDMA relay station of a wireless communication network using FDMA system, and it is basically configured by means for receiving a call signal from a repeater wireless terminal in the wireless communication network using repeater system, by the repeater relay station; means for forwarding the call signal received by the repeater relay station to the FDMA relay station; means for setting the forwarded call signal for a control signal at the FDMA relay station; means for transmitting the control signal to an FDMA wireless terminal in the wireless communication network using FDMA system; and means for the FDMA wireless terminal, which has received the control signal, to communicate with the repeater wireless terminal via the repeater relay station.

A wireless terminal according to a third aspect of the present invention is an FDMA wireless terminal to be used in a business wireless communication system which includes both a repeater relay station of a wireless communication network using repeater system and an FDMA relay station of a wireless communication network using FDMA system, wherein the FDMA relay station sets a call signal from a repeater wireless terminal in the wireless communication network using repeater system, which has been forwarded from the repeater relay station, for a control signal; and the FDMA wireless terminal in the wireless communication network using FDMA system has means for receiving the control signal sent thereto to communicate with the repeater wireless terminal via the repeater relay station.

According to the wireless-communication-related technical approach of the present invention, it is possible to wait for call signals of two different wireless communication systems with a single reception frequency.

BRIEF DESCRIPTION OF THE DRAWINGS

FIG. 3 is a diagram illustrating a call signal format according to the present invention.

BEST MODE FOR CARRYING OUT THE INVENTION

An embodiment of the present invention will be described below in detail with reference to drawings.

Figure 1:
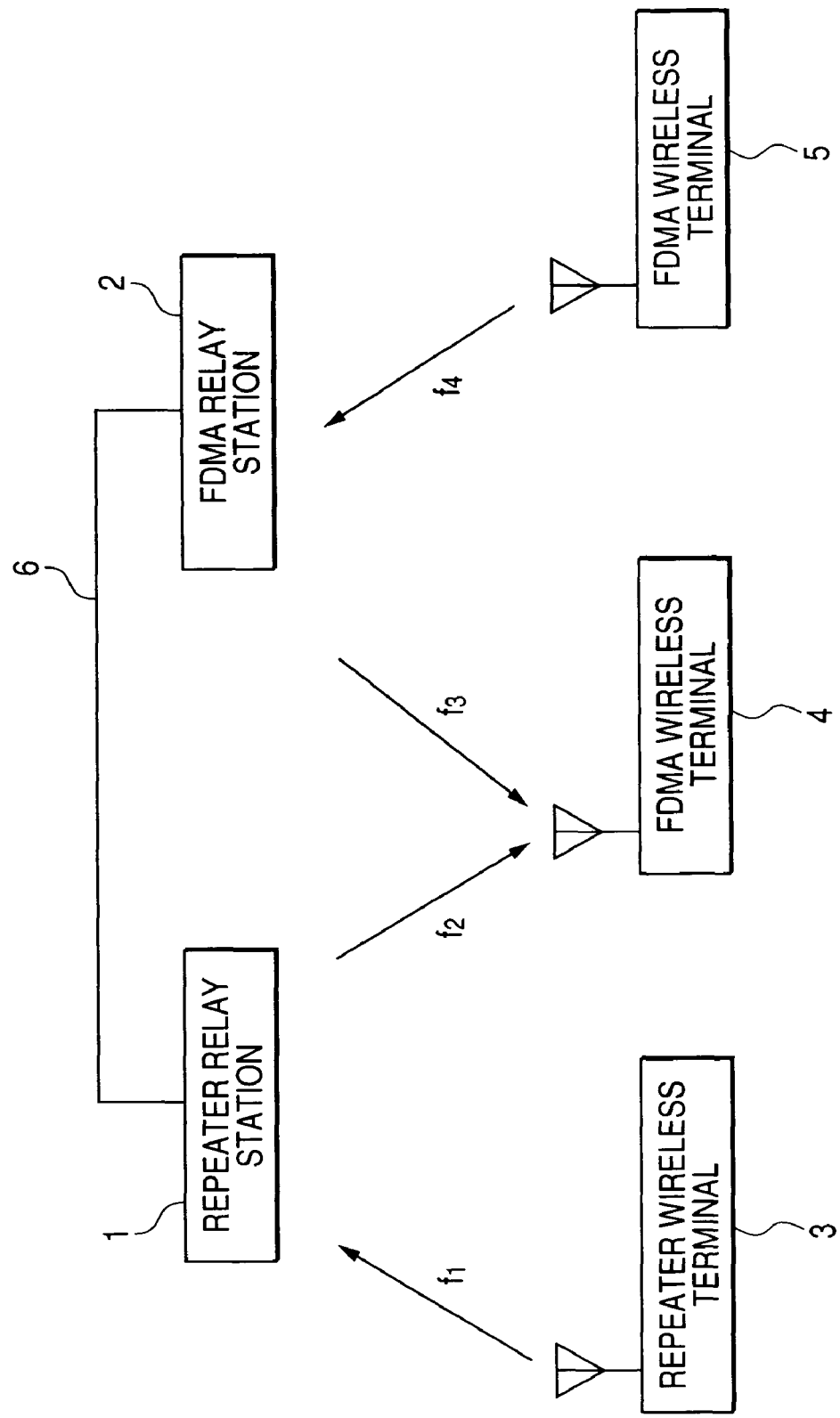
FIG. 1 is a block diagram illustrating an embodiment of a business wireless communication system according to the present invention.

FIG. 1 is a block diagram illustrating an embodiment of a business wireless communication system according to the present invention. The business wireless communication system is configured by a repeater relay station 1, an FDMA relay station 2, a repeater wireless terminal 3 and FDMA wireless terminals 4 and 5. The repeater relay station 1 is connected to the FDMA relay station 2 via a communication line 6, and it forwards a call signal via serial communication. The repeater wireless terminal 3 communicates with another repeater wireless terminal (not shown) in a wireless network using repeater system, via the repeater relay station 1 with the use of an uplink frequency f1 and a downlink frequency f2. Furthermore, it can communicate with the FDMA wireless terminals 4 and 5 via the repeater relay station 1. The FDMA wireless terminals 4 and 5 perform communication connection within a wireless network using FDMA system, via the FDMA relay station with an uplink control channel frequency f4 and a downlink control channel frequency f3. Furthermore, the FDMA wireless terminals 4 and 5 can communicate with the repeater wireless terminal 3 via the repeater relay station 1 with the uplink frequency f1 and the downlink frequency f2.

Description will be made on a case where the repeater wireless terminal 3 communicates with the FDMA wireless terminal 4. The repeater wireless terminal 3 transmits a call signal of the FDMA wireless terminal 4 on the uplink frequency f1 to the repeater relay station 1. After receiving this call signal, the repeater relay station 1 serially forwards the signal to the FDMA relay station 2 via the communication line 6. The FDMA relay station 2 sets this call signal for a control signal of the downlink control channel frequency f3 and transmits it into the wireless network using FDMA system. The FDMA wireless terminal 4 in a waiting condition receives this call signal. Furthermore, it detects the downlink frequency f2 of the repeater relay station 1 from reception frequency information set in the wireless terminal in advance, based on information about the call signal, and switches the downlink control channel frequency f3 to the downlink frequency f2. The repeater relay station 1 receives the signal which the repeater wireless terminal 3 has transmitted on the uplink frequency, forwards the call signal to the FDMA relay station 2, and relay-transmits a voice signal to the downlink frequency f2. Accordingly, the FDMA wireless terminal 4 which has switched the reception frequency to f2 receives the voice signal of the repeater wireless terminal 3 and starts communication.

Figure 2:
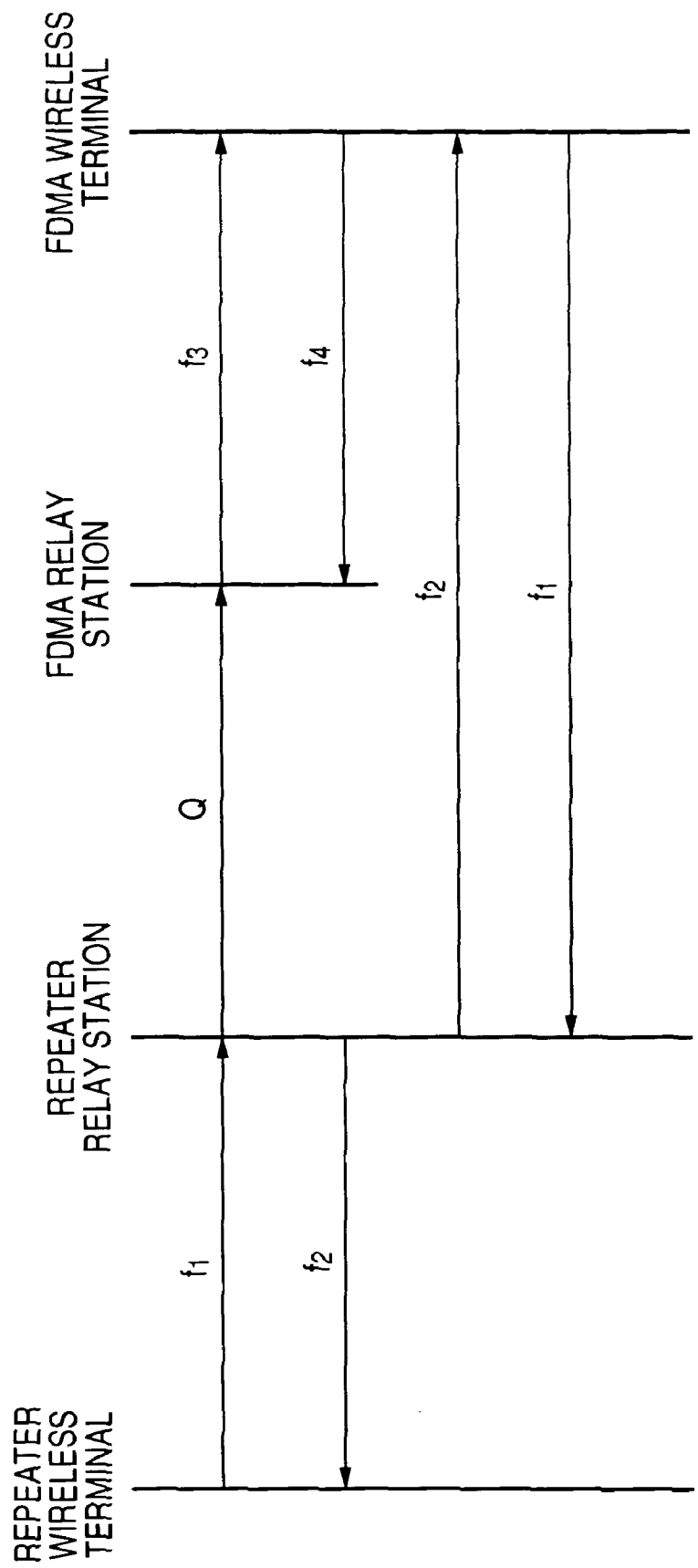
FIG. 2 is a transition diagram illustrating the flow of a call signal and communication of the present invention.

FIG. 2 is a transition diagram illustrating the flow of a call signal and communication. Repeater wireless terminals communicate with each other with the uplink frequency f1 and the downlink frequency f2 via the repeater relay station. FDMA wireless terminals communicate with each other with the uplink control channel frequency f4 and the downlink control channel frequency f3 via the FDMA relay station. Communication between a repeater wireless terminal and an FDMA wireless terminal is started by the repeater relay station receiving a call signal of the repeater wireless terminal and serially forwarding it to the FDMA relay station, the FDMA relay station transmitting it on the downlink control channel frequency f3 to the FDMA wireless terminal, and the FDMA wireless terminal receiving it and changing the reception frequency from f3 to f2. Here, the FDMA wireless terminal acquires connection information from the frequency f3. When connection with the repeater wireless terminal is established, communication is performed in a wireless communication network using repeater system.

FIG. 3 is a diagram illustrating a call signal format to be used by a wireless terminal and a relay station to perform connection. A indicates a call signal format for a repeater wireless terminal or an FDMA wireless terminal, and it is configured by a call classifier and a terminal identifier. B indicates a call signal format used by a repeater relay station for forwarding to an FDMA relay station, and it is configured by a synchronous signal pattern, a call classifier, a terminal identifier, a relay station identifier and information added by the relay station. C indicates a call signal format used by an FDMA relay station for transmission into the wireless network using FDMA system, and it is configured by a synchronous signal pattern, system information and terminal control information.

To perform communication between FDMA wireless terminals, the FDMA wireless terminal 5 transmits a call classifier indicating an individual call, a broadcast notification or the like and an identifier such as an individual number and a broadcast number on the uplink control channel frequency f4, to the FDMA relay station 2 (A). After receiving this call signal, the FDMA relay station 2 sets this call signal for terminal control information of a control signal of the downlink control channel frequency f3 and transmits it into the wireless network using FDMA system (C). The FDMA wireless terminal 4 in a waiting condition receives this call signal. Communication with the FDMA wireless terminal 5 is started through an FDMA voice channel.

The repeater wireless terminal 3 transmits a call classifier indicating an individual call, a broadcast notification or the like and an identifier such as an individual number and a broadcast number on the uplink frequency f1, to the repeater relay station 1 (A). After receiving this call signal, the repeater relay station 1 adds an identifier indicating the type of the relay station and information for communication with the relay station such as a frequency to this signal, and serially transmits the signal to the FDMA relay station 2 via the communication line 6 (B). The FDMA relay station 2 sets this call signal for terminal control information of a control signal of the downlink control channel frequency f3 and transmits it into the wireless network using FDMA system (C). The FDMA wireless terminal 4 in a waiting condition receives this call signal.

In the call signal pattern C in FIG. 3, the synchronous signal pattern, the system information and the terminal control information are transmitted in a constant repetition cycle. When receiving a call signal from a repeater wireless terminal or an FDMA wireless terminal, the FDMA relay station 2 sets the signal for the terminal control information and transmits it into the wireless network using FDMA system, in order of receipt. Based on whether the call is via a wireless communication network using repeater system or via the wireless communication network using FDMA system, information required by the communication system is set for the system information.

Figure 4:
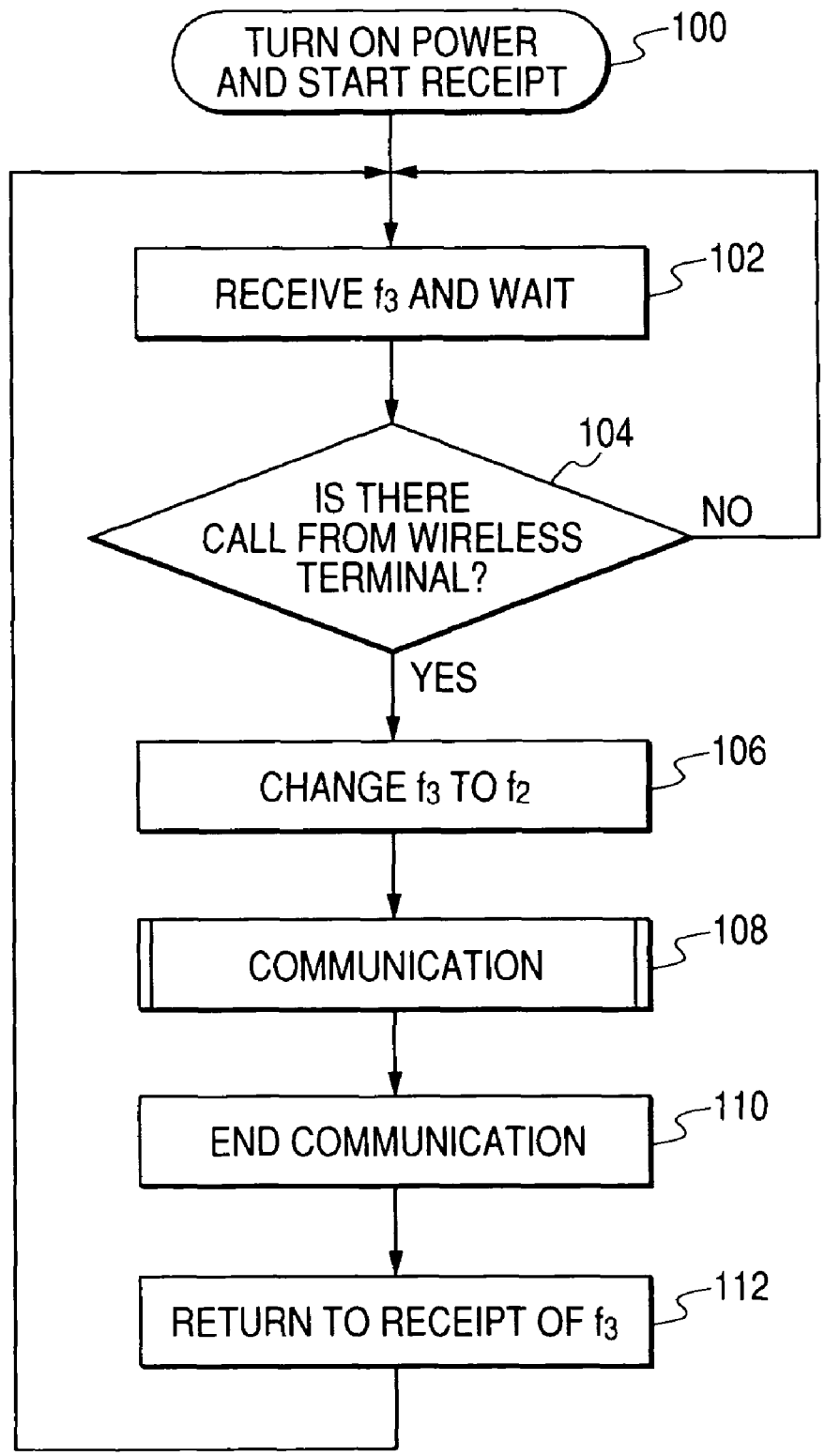
FIG. 4 is a flowchart showing the flow of communication according to the present invention.

FIG. 4 is a flowchart showing the flow of an FDMA wireless terminal communicating with a repeater wireless terminal. The FDMA wireless terminal is powered on to start receiving (step 100). The FDMA wireless terminal waits for a call with the downlink control channel frequency f3 (step 102). If there is a call from a wireless terminal, the FDMA wireless terminal proceeds to the next step (step 104). If the call is from a repeater wireless terminal, then the reception frequency is changed from f3 to f2 (step 106). If the call is from an FDMA wireless terminal, then communication is started via an FDMA-based voice channel (not shown). A message from the repeater wireless terminal is received with the downlink frequency f2, and call communication is performed (step 108). The call communication ends (step 110). The FDMA wireless terminal returns to the reception frequency of the downlink control channel frequency f3 and enters a condition of waiting for a call signal (step 112).

As described above, according to the present invention, since it is possible to wait for both of a call from a wireless communication network using repeater system and a call from a wireless communication network using FDMA system with a single reception frequency, wireless communication without call loss is possible. Switching of the frequency of an FDMA wireless terminal may be performed by any circuit if it is means for realizing the function, and it is also possible to realize a part or all of the function by software.

INDUSTRIAL APPLICABILITY

According to the present invention, there is provided a wireless communication method for waiting for call signals from relay stations using different wireless communication systems. This method can be effectively used in a business wireless communication system which includes both a repeater relay station of a wireless network using repeater system and an FDMA relay station of a wireless network using FDMA system.

The invention claimed is:

1. A communication method used in a wireless communication system which includes both a repeater relay station of a wireless communication network using repeater system and a frequency division multiple access (FDMA) relay station of a wireless communication network using FDMA system, the method comprising the steps of:

receiving a call signal from a repeater wireless terminal in the wireless communication network using repeater system, by the repeater relay station;

connecting the repeater relay station to the FDMA relay station by a line to forward the call signal received by the repeater relay station to the FDMA relay station after adding a relay station identifier and relay station communication information to the received call signal;

setting the forwarded call signal in a terminal control information field in a control signal and setting auxiliary information in a system information field in the control signal at the FDMA relay station;

transmitting the control signal to an FDMA wireless terminal in the wireless communication network using FDMA system;

detecting by the FDMA wireless terminal, which has received the control signal having the terminal control information field and system information field, the call signal being from the repeater wireless terminal and a downlink frequency (e.g., f2) of the repeater relay station, on the basis of the received control signal;

switching by the FDMA wireless terminal its own reception frequency from a downlink frequency (e.g., f3) of the FDMA relay station to the downlink frequency (e.g., f2) of the repeater relay station;

relay-transmitting by the repeater relay station a voice signal contained in a signal transmitted by the repeater wireless terminal to the downlink frequency (e.g., f2); and receiving the voice signal from the repeater wireless terminal by the FDMA wireless terminal whose reception frequency has been changed to the downlink frequency (e.g., f2) so that the FDMA wireless terminal communicates via the repeater relay station with the repeater wireless terminal, wherein the call signal to be transmitted from the repeater wireless terminal to the repeater relay station, the call signal to be transmitted from the repeater relay station to the FDMA relay station and the call signal to be transmitted from the FDMA relay station to the FDMA wireless terminal are carried by using respective distinct signal formats.

2. A wireless communication system which includes both a repeater relay stations of a wireless communication network using repeater system and an FDMA relay station of a wireless communication network using FDMA system, the system comprising:

means for receiving a call signal from a repeater wireless terminal in the wireless communication network using repeater system, by the repeater relay station;

means for forwarding the call signal received by the repeater relay station to the FDMA relay station connected to the repeater relay station by a line, after adding a relay station identifier and relay station communication information to the received call signal;

means for setting the forwarded call signal in a terminal control information field in a control signal and for setting auxiliary information in a system information field in the control signal at the FDMA relay station;

means for transmitting the control signal to an FDMA wireless terminal in the wireless communication network using FDMA system;

means for detecting by the FDMA wireless terminal, which has received the control signal having the terminal control information field and the system information field, the call signal being from the repeater wireless terminal and a downlink frequency (e.g., f2) of the repeater relay station, on the basis of the received control signal;

means for switching by the FDMA wireless terminal its own reception frequency from a downlink frequency (e.g., f3) of the FDMA relay station to the downlink frequency (e.g., f2) of the repeater relay station;

means for relay-transmitting by the repeater relay station a voice signal contained in a signal transmitted by the repeater wireless terminal to the downlink frequency (e.g., f2); and means for receiving the voice signal from the repeater wireless terminal by the FDMA wireless terminal whose reception frequency has been changed to the downlink frequency (e.g., f2) so that the FDMA wireless terminal communicates via the repeater relay station with the repeater wireless terminal, wherein the call signal to be transmitted from the repeater wireless terminal to the repeater relay station, the call signal to be transmitted from the repeater relay station to the FDMA relay station and the call signal to be transmitted from the FDMA relay station to the FDMA wireless terminal are carried by using respective distinct signal formats.

3. An FDMA wireless terminal to be used in a business wireless communication system which includes both a repeater relay station of a wireless communication network using repeater system and an FDMA relay station of a wireless communication network using FDMA system, wherein the repeater relay station and the FDMA relay station are connected to each other by a line, the repeater relay station, which has received a call signal from a repeater wireless terminal in the wireless communication network using repeater system, forwards the received call signal to the FDMA relay station after adding a relay station identifier and relay station communication information to the received call signal; the FDMA relay station sets the call signal forwarded from the repeater relay station in a terminal control information field in a control signal and sets auxiliary information in a system information field in the control signal to transmit the control signal to an FDMA wireless terminal in the wireless communication network using FDMA system; and the FDMA wireless terminal in the wireless communication network using FDMA system has means for receiving the control signal sent thereto to communicate with the repeater wireless terminal via the repeater relay station, wherein the call signal to be transmitted from the repeater wireless terminal to the repeater relay station, the call signal to be transmitted from the repeater relay station to the FDMA relay station and the call signal to be transmitted from the FDMA relay station to the FDMA wireless terminal are carried by using respective distinct signal formats, wherein the FDMA wireless terminal, which has received the control signal having the terminal control information field and the system information field, operates to detect the call signal being from the repeater wireless terminal and a downlink frequency (e.g., f2) of the repeater relay station, on the basis of the received control signal, and further operates to switch its own reception frequency from a downlink frequency (e.g., f3) of the FDMA relay station to the downlink frequency (e.g., f2) of the repeater relay station, and wherein the repeater relay station operates to relay-transmit a voice signal contained in a signal transmitted by the repeater wireless terminal to the downlink frequency (e.g., f2), and the FDMA wireless terminal whose reception frequency has been changed to the downlink frequency (e.g., f2) operates to receive the voice signal transmitted from the repeater wireless terminal so that the FDMA wireless terminal communicates via the repeater relay station with the repeater wireless terminal.

4. The communication method according to claim 1, wherein the signal format for the call signal from the repeater wireless terminal to the repeater relay station comprises a call classifier and a terminal identifier, the signal format for the call signal from the repeater relay station to the FDMA relay station comprises a synchronous signal pattern, a call classifier, a terminal identifier, a relay station identifier and information added by relay station, and the format for the call signal from the FDMA relay station to the FDMA wireless terminal comprises a synchronous signal pattern, system information and terminal control information.

* * * * *